July 6, 1926. 1,591,216

A. C. LAGERWALL

MARKING MACHINE

Filed July 28, 1924 2 Sheets-Sheet 1

Inventor
A. C. Lagerwall
By E. A. Bond
Attorney

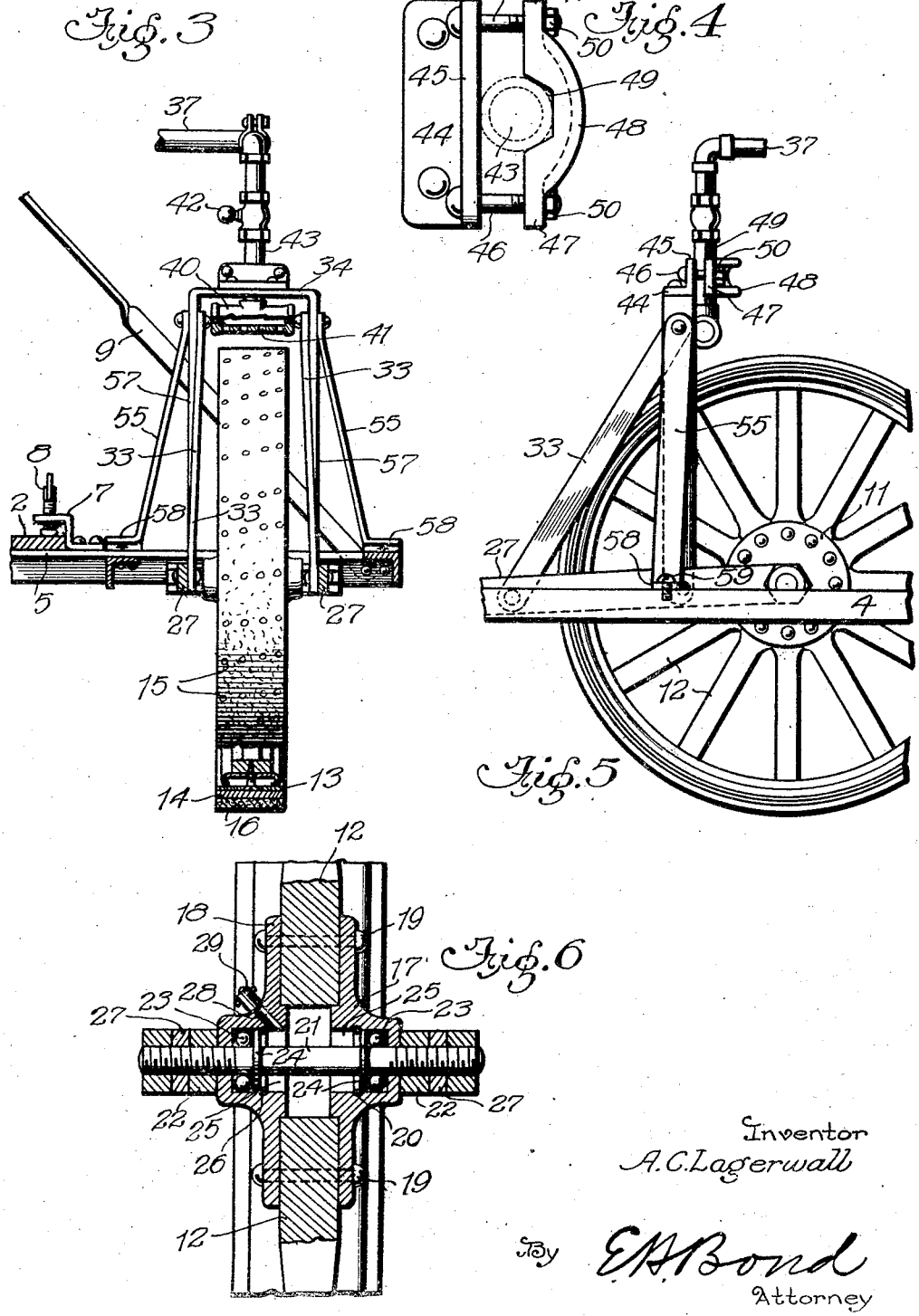

Patented July 6, 1926.

1,591,216

UNITED STATES PATENT OFFICE.

ADLEE C. LAGERWALL, OF TOPEKA, KANSAS.

MARKING MACHINE.

Application filed July 28, 1924. Serial No. 728,610.

This invention relates to certain new and useful improvements in road-marking devices, and it has for its objects among others to provide a simple, yet efficient, durable and reliable device, readily attachable to the running-board or other desired part of a truck or automobile or other vehicle, for the purpose of marking the centre line of a pavement, and filling longitudinal joints, on highways or wherever desired, such as pavements, race tracks or any surface where it is desired to quickly and easily apply a line of demarcation for any required purpose, or maintaining any longitudinal joints in pavements.

It has for its objects further to provide a device of this character having provision for utilizing the shipping container for the paint or other marking material as the reservoir, providing a suitable support or stand therefor supported from the car or truck, and simple means for elevating the marking wheel or member from the ground when moving from one place to another or when it is not desired to employ the marker member.

It has for a further object to provide a guide ahead of the marking wheel to aid or guide the driver or operator of the car as the marking proceeds.

I aim further at improvements in the details of construction and in the means for facilitating the application and removal of the marking mechanism from the vehicle when desired.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which:

Figure 3 is a vertical cross section on the line 3—3 of Figure 1.

Figure 4 is an enlarged detail in plan of the clamp for the discharge pipe from the container.

Figure 5 is an enlarged detail with portions broken away, showing the marking wheel and the means for holding the same in elevated position.

Figure 6 is an enlarged central section through the hub of the marking wheel.

Like numerals of reference indicate like parts throughout the different views.

Figure 1:
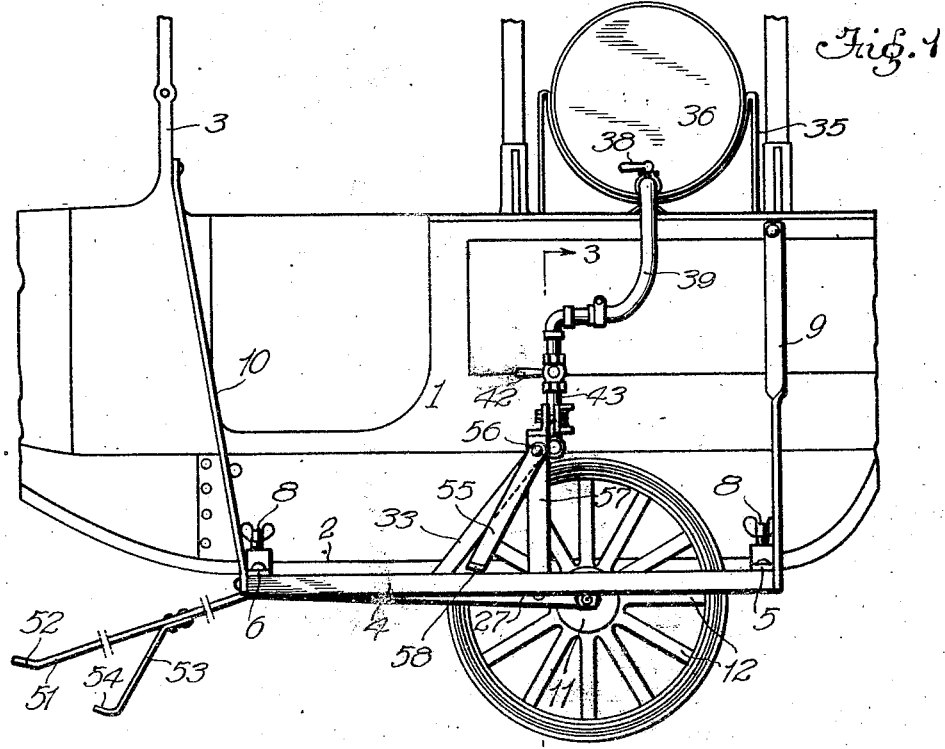
Figure 1 is a side elevation of a portion of a vehicle with parts broken away, showing the application of my present invention.

Referring to the drawings, 1 designates a portion of the body of a motor vehicle or truck, 2 the running-board thereof, and 3 the dash.

My present invention, which is, in effect, an attachment to the motor vehicle, in the present instance, shown as applicable to the running-board, comprises a frame consisting of the side member 4 and the end members 5 and 6 of rigid construction, the members 5 and 6 having affixed thereto the angle members 7, the said side members being attached to extend over or under the running-board and the upper horizontal portions of the members 7 extended over the upper surface thereof and the whole designed to be clamped to the running-board by suitable thumb screws or the like 8, thus constituting a clamp by which the device may be securely held in position.

Rising from the front and rear ends of the frame are the uprights 9 and 10, as seen best in Figure 1, the upper ends of which are designed to be secured to some suitable fixed part of the vehicle.

Within this frame is supported the marking wheel which, in this instance, comprises a hub 11 and spokes 12, of suitable construction, that preferred being herein illustrated. The spokes carry at their outer ends the rim 13 preferably of metal upon which is a band or belt 14 to which is applied by tacks 15 or other means, the peripheral covering 16 of felt, rubber, or other material suitable for absorbing and transferring the paint, coloring matter or maintenance material to the pavement or other surface. The hub shown in the present instance comprises the opposed members 17 and 18, between the flanges of which are secured the spokes 12 in some suitable manner, as by the pins or rivets 19, see Figure 6, the two opposed members of the hub being provided each with an internal annular central recess 20 through which passes the threaded axle 21 receiving upon each end the nuts 22, the said axle being threaded into the central cap portions of the hub sections, as seen in Figure 3.

23 are ball bearings for the axle, 24 being a washer and 25 springs seated in annular depressions 26 within the recesses 20, all as seen best in Figure 6. These lock springs serve to retain the washers in place. Between the nuts, upon each end of the axle, are the wheel guides 27, see Figure 6. In one of the hub sections is an oil passage 28 closed by a suitable cap or the like 29, whereby oil or other lubricant may be readily supplied to the chamber within the hub.

Figure 2:
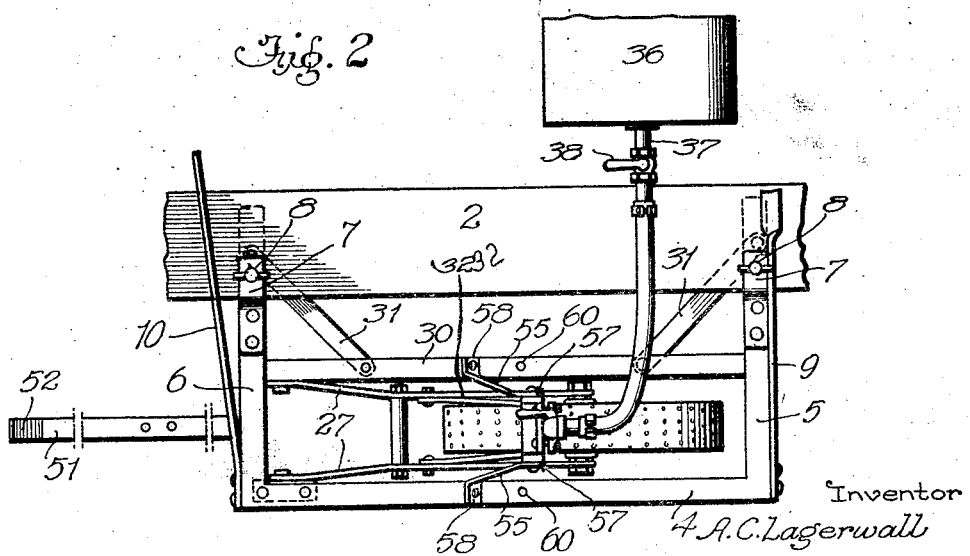
Figure 2 is a top plan of sufficient of the parts to illustrate the application of the invention.

The wheel guides 27 in this instance, extending from opposite sides of the axle have their ends attached to the forward ends of the members 4 and 30 of the wheel supporting frame, as seen best in Figure 2, inclined braces 31 being provided to supply the requisite strength to the frame, as seen in Figure 2.

The axle is supported in a suitable frame pivotally supported from the members 27, of which the inclined members 32 are attached to the upper portions of the yoke 33 of which 34 is the upper cross member.

35 is a supporting rack or the like adapted to receive and retain the container 36, such as a barrel or other container, adapted to contain the paint or other liquid employed and from this container extends a pipe 37 provided with a valve or the like 38 adjacent its connection with the container, and connected with this pipe is a pipe 39 which may or may not be flexible, as preferred, and which extends to and is connected with the T-member 40, as seen best in Figure 3, the horizontal portion of this T-member extending parallel with and in quite close proximity to the periphery of the wheel and having a multiplicity of discharge openings 41, as seen in Figure 3.

42 is a suitable valve located in proximity to this T-member 40 in a position readily accessible to the driver.

In order to clamp the pipe 43 interposed between the pipe 39 and the member 40 firmly in position, I provide suitable means, such as that shown in Figure 4, wherein 44 is an angled member secured to the upper portion of the wheel supporting frame and through the upright portion 45 thereof I pass the bolts 46 which pass through the flanges 47 of the member 48, the inner face of which is notched, as at 49, and in which notch is designed to be received the pipe 43. When the nuts 50 of these bolts are screwed up, the pipe is firmly held and gripped by the angular walls of the member 48, as will be readily understood.

Secured to the forward portion of the frame 4 is a forwardly and downwardly inclined member 51, see Figures 1 and 2, the forward end of which may be flattened, as seen at 52, to form a guide for the driver, while a supplemental guide member 53 may be employed, attached to the under side of the member 51 and having an angled portion 54, as seen in Figure 1.

In order to elevate the marking wheel when not in use or for other purposes, I provide the side members 55 pivotally mounted at their upper ends, as at 56, upon the uprights 57 of the wheel supporting frame and having at their lower ends the angled portions 58, as seen in Figures 1, 3 and 5. When the marking wheel is in operative position, these members 55 are turned to their inclined position, as seen in Figure 1, so as to allow the wheel to drop into engagement with the surface to be marked. When it is desired to hold the marking wheel elevated, these members are moved on their pivots to an upright position, which raises the wheel out of contact with the ground. Suitable means, as the screws 59, may be employed to hold the members 55 in their inclined or in their vertical positions, suitable holes 60 being provided in the frame for this purpose.

The operation will be readily understood from the foregoing description, when taken in connection with the annexed drawings. Figures 1 and 2 show the device in operative position attached to the running-board. Thus attached and the car started, the valves 38 and 42 are turned so as to allow of the discharge of the paint or other fluid from the container 36 through the pipes described into the T-member 40, from which it flows through the apertures 41 onto the periphery of the wheel and as the latter revolves during the movement of the car the material is applied to the road or other surface, the guides 51 and 53 serving to guide the eye of the driver so that the marking or filling may be done in the required position. When through marking or filling, the valves 38 and 42 are closed and the members 55 are moved to their vertical position, raising the marking member from contact with the ground or other surface.

Where, in the following claims, I refer to the "marking wheel" or "marking member" it is to be construed as having reference to the member by which the marking liquid or the joint filling material is placed in position on the surface or in the joint to be filled.

Modifications in detail may be resorted to without departing from the spirit of the invention or sacrificing any of its advantages.

What is claimed as new is:—

1. An attachment for motor vehicles comprising a marking member, supporting means therefor, and means for establishing a readily detachable connection with the body of said vehicle.

2. A portable attachment for motor vehicles, comprising a marking member, supporting means therefor, means for establishing a readily detachable connection with the said vehicle independent of the wheel thereof.

3. An attachment for motor vehicles, comprising a marking member, supporting means therefor, means for establishing a readily detachable connection with said vehicle independent of the wheels of the latter, and means for supplying a marking material to the marking member.

4. A liquid marking attachment applicable for detachable application as an entirety to a movable vehicle, a frame, a pivotally-mounted support for the marking member, means for holding the marking member out of contact with the surface to be marked, and a guide for the eye of the driver carried by the frame of said attachment and means for attaching the attachment to a vehicle.

5. A device for the purpose described designed for attachment in its entirety to a vehicle having a running board and comprising a supporting frame, means for attaching the same to the running-board of a movable vehicle, a marking member rotatably mounted in said frame, and means for supplying the marking material to said marking member.

6. A device for the purpose described designed for attachment in its entirety to a vehicle having a running board and comprising a supporting frame, means for attaching the same to the running-board of a movable vehicle, a marking member rotatably mounted in said frame, means for supplying the marking material to said marking member, and means for holding the marking member out of operative contact with the surface to be marked.

7. A device for the purpose described designed for attachment in its entirety to a vehicle having a running board and comprising a supporting frame, means for attaching the same to the running-board of a movable vehicle, a marking member rotatably mounted in said frame, means for supplying the marking material to said marking member, means for holding the marking member out of operative contact with the surface to be marked, and a guide for the operator, supported on said frame.

8. A device for the purpose described designed for attachment in its entirety to a vehicle having a running board and comprising a supporting frame, means for attaching the same to the running-board of a movable vehicle, a member rotatably mounted in said frame, means for supplying the marking material to said member, means for holding the marking member out of operative contact with the surface to be treated, and a guide for the operator supported on said frame in longitudinal alignment with the said member.

9. A marking attachment for a movable vehicle comprising a frame with means for clamping the same in position upon a fixed member of the vehicle, an adjustable support in said frame, and a marking wheel rotatably mounted in said support.

10. A marking attachment for a movable vehicle comprising a fixed member, as a frame, with means for clamping the same in position upon a fixed portion of the vehicle, an adjustable support in said frame, a marking wheel rotatably mounted in said support, and a pivotally-mounted member on the support for engagement with the frame to hold the marking wheel when in raised position.

11. A marking attachment for a movable vehicle, comprising a frame with means for clamping the same in position upon a fixed member of the vehicle, an adjustable support in said frame, a marking wheel rotatably mounted in said support, a pivotally-mounted member on the support for engagement with the frame to hold the marking wheel in raised position, a material-control on said support, and a source of supply for material thereto.

12. A marking attachment for a movable vehicle comprising a frame with means for clamping the same in position upon a fixed member of the vehicle, an adjustable support in said frame, a marking wheel rotatably mounted in said support, a member on the support for engagement with the frame to hold the marking wheel in raised position, a material control on said support, a source of liquid supply therefor, and liquid-controlling means accessible to the operator of the vehicle.

13. A road marking device designed for attachment in its entirety to a vehicle having a running board and comprising a frame attachable to the running-board of a motor vehicle, a support for a material-container mounted upon the vehicle, a rotatable marking member, and means for conveying material from said container to said marking member.

14. A road marking device designed for attachment in its entirety to a vehicle having a running board and comprising a frame attachable to the running-board of a motor vehicle, a support for a liquid container mounted upon the vehicle, a rotatable marking member, means for conveying liquid from said container to said marking member, an adjustable support for the marking member, and means for maintaining the marking member out of operative relation with the surface to be marked.

In testimony whereof I affix my signature.

ADLEE C. LAGERWALL.